July 10, 1962  C. C. FARLEE  3,043,608
SAFETY DEVICE AND TABLE ARRANGEMENT FOR VEHICLE BODIES
Filed Oct. 20, 1960  2 Sheets-Sheet 1

INVENTOR.
Clarence C. Farlee
BY
Herbert Furman
ATTORNEY

July 10, 1962 C. C. FARLEE 3,043,608
SAFETY DEVICE AND TABLE ARRANGEMENT FOR VEHICLE BODIES
Filed Oct. 20, 1960 2 Sheets-Sheet 2

INVENTOR.
Clarence C. Farlee
BY
Herbert Furman
ATTORNEY

United States Patent Office 3,043,608
Patented July 10, 1962

3,043,608
SAFETY DEVICE AND TABLE ARRANGEMENT
FOR VEHICLE BODIES
Clarence C. Farlee, Utica, Mich., assignor to General Motors Corporation, Detroit, Mich., a corporation of Delaware
Filed Oct. 20, 1960, Ser. No. 63,780
2 Claims. (Cl. 280—150)

This invention relates to vehicle bodies and more particularly to a combined safety device and table arrangement for vehicle bodies.

In the preferred embodiment of the invention, a table member is hingedly mounted on the back of a vehicle front seat for movement between a generally upright position and a generally horizontal position. One side of the table member is provided with a flat surface suitable for writing, with this side bearing against the seat back in the upright position of the table member and being disposed generally horizontal in the horizontal position of the table member so as to be available for use by a rear seat passenger. The other side of the table member is provided with suitable padding which extends over the upper edge of the table member to the one side thereof. When the table member is in its upright position, this padding may be engaged by the rear seat passenger in the event of a sudden stop to provide a safety barrier, and when the table member is in a generally horizontal position, the padding over the upper edge of the table member provides a safety barrier for the rear seat passenger. The invention further provides an improved hinging arrangement for moving the table member between its upright and its horizontally disposed positions and for supporting the table member in its horizontally disposed position against the weight of the passenger leaning upon it. The hinging arrangement is arranged so that the table member will automatically move to its horizontally disposed position when a latch, holding the table in its upright position, is released.

One of the objects of this invention is to provide a new and improved safety device and table arrangement for vehicle bodies. Another object of this invention is to provide a new and improved table arrangement and safety device for vehicle front seats which is movable between a normal upright position wherein it provides a safety barrier for a rear seat passenger, and a generally horizontally disposed position wherein it provides a writing table for a rear seat passenger as well as providing a safety barrier. Yet a further object of this invention is to provide a new and improved hinge means for a swingable member movable between upright and horizontally disposed positions, with the hinge means serving to support the member in its horizontally disposed position against weight placed thereon.

These and other objects of the invention will be readily apparent from the following specification and drawings wherein.

Figure 1:
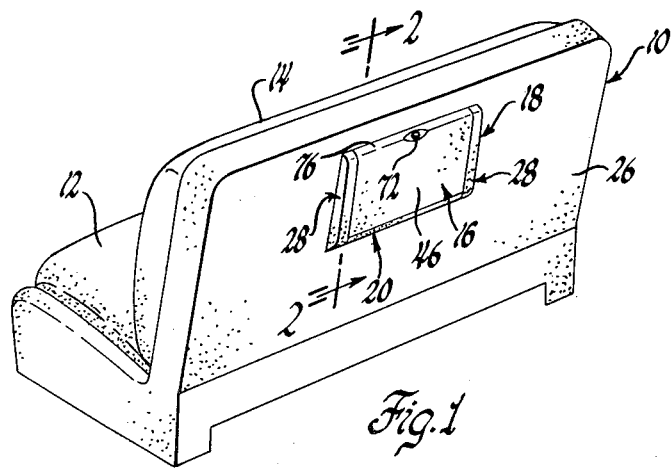
FIGURE 1 is a rear perspective view of a vehicle front seat embodying a safety device and table arrangement according to this arrangement.

Referring now particularly to FIGURE 1 of the drawings, a vehicle front seat 10 includes a seat cushion 12 and a seat back 14 which are supported within a seat frame. A table member 16 is hingedly mounted on the back of the seat 10 for movement between an upright position, as shown in FIGURES 1 and 2, wherein it provides a safety barrier for a rear seat passenger to prevent the passenger from injuring himself by engaging the seat 10 in the event of a sudden stop, or otherwise, and a horizontal position, as shown in FIGURE 3, wherein it provides a writing table capable of supporting weight and additionally provides a safety barrier for the rear seat passenger.

The table member 16 is movable between its positions within a generally U-shaped frame arrangement 18 secured to the seat back. The lower member 20 of the frame arrangement, as shown in FIGURE 2, includes a member 21 of angular cross section, each leg thereof being provided with a flange 22 which abuts against and is rigidly secured to the back panel 24 of the seat frame of seat 10. The fabric 26 covering the back panel of the seat extends over the member 20 and is suitably secured to the upper leg thereof. The side members 28 of frame 18 include a member 29 of generally channel-shaped cross section, with each of the legs thereof being flanged at 30, FIGURE 4, so as to be secured to the back panel 24 of the seat frame. The base and outer legs of the member 29 are covered with padding 32, and the fabric 26 extends over this padding and is secured in a suitable manner to the base of each member 29 adjacent the inner leg thereof and intermediate the base and the padding 32.

Figure 2:
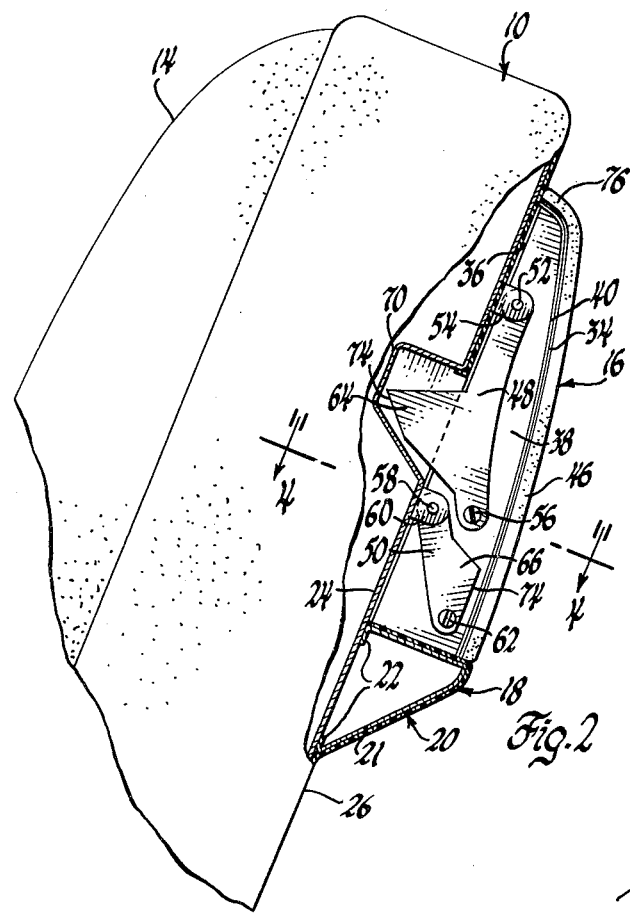
FIGURE 2 is an enlarged view taken generally along the plane indicated by a line 2—2 of FIGURE 1 with parts thereof broken away for clarity of illustration.
Figure 3:
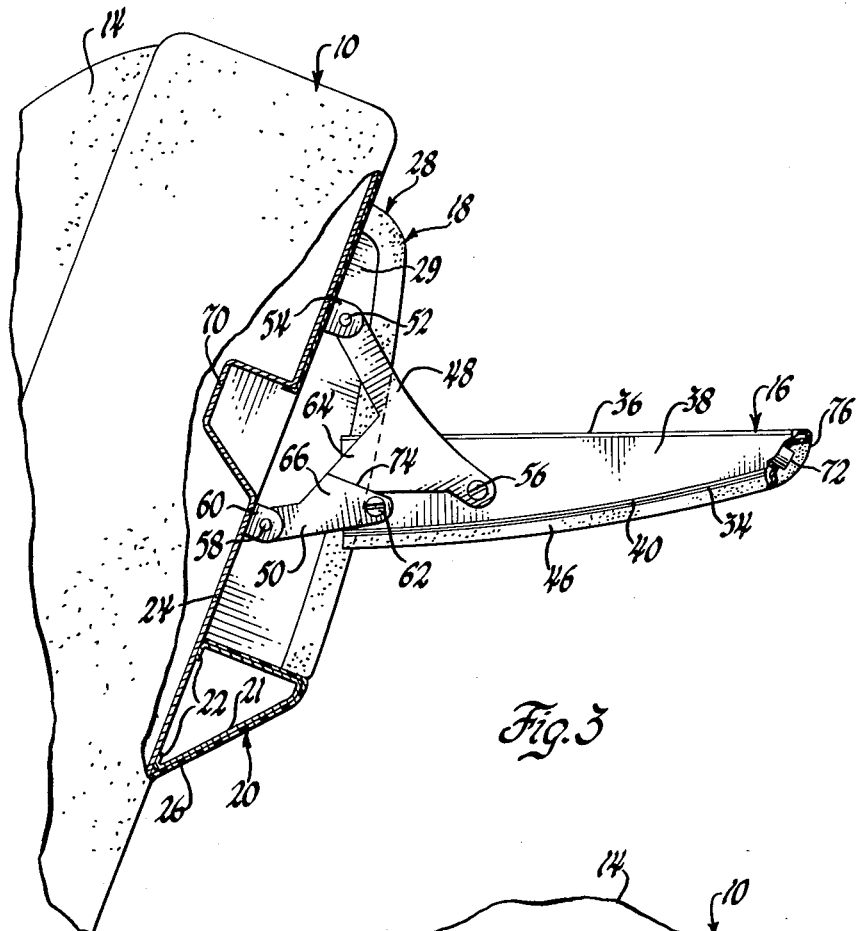
FIGURE 3 is a view similar to FIGURE 2 showing the table in its horizontally disposed position.

The table member 16 includes a first panel 34 of generally arcuate cross section, as can be seen in FIGURES 2 and 3, and a second panel 36 which is generally flat, with these panels being secured together at the side edge portions thereof by side panels 38 having arcuate flanges 40 conforming to the curvature of panel 34 and secured thereto, and flat flanges 42 secured to the panel 36. Thus, the member 16 is generally of hollow construction. The panel 34 is covered with padding 44, with this padding being covered by a fabric 46 which matches the fabric 26. The edges of the fabric 46 extend around the edge portions of the padding 44 and between the padding 44 and the panel 34, and being secured to the panel 44 in a suitable manner.

Figure 4:
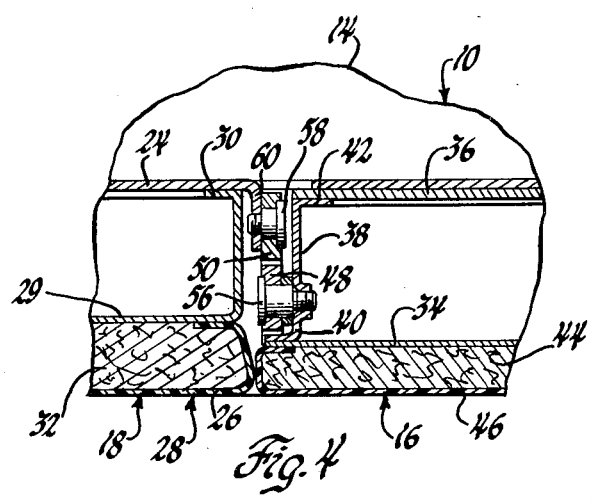
FIGURE 4 is an enlarged sectional view taken generally along the plane indicated by line 4—4 of FIGURE 2.

The hinge means mounting the member 16 on the back of the seat 10 are the same at each side thereof and generally comprise a pair of links 48 and 50. As best seen in FIGURES 2 through 4 of the drawings, links 48 have one end thereof pivoted at 52 to lanced tabs 54 of panel 24, and the other ends thereof pivoted at 56 to the side panels 38 of member 16. Links 50 likewise have one end thereof pivoted at 58 to lanced tabs 60 of panel 24, and the other ends thereof pivoted at 62 to the side panels 38 of member 16. Both of the links include extension portions 64 and 66, respectively. When the table member 16 is in an upright position, as shown in FIGURES 1 and 2, the extension portions 64 of links 48 are received within a recess 70 which is provided in the panel 24 and extends between the inner legs of the members 29. The table is held in this position by a suitable push button type of latch 72, the details of which are not shown since it is of known construction. Reference may be had to McClelland 2,744,405 for the details of a suitable latch. Upon release of the latch 72, the table member 16 automatically moves under gravity to its horizontal position, as shown in FIGURE 3. During this movement of the table member 16, links 48 and 50 swing upwardly about their pivots 52 and 58 on the seat back to bring the edge portions 74 of their respective extensions into engagement with each other, as shown in FIGURE 3, to thereby locate the member 16 in its horizontal position. It will be noted that the edge portions are of considerable extent whereby the hinge means are adequate to support the table even though considerable weight is placed thereon.

When the table member is in its horizontal position, it will be noted that the panel 36 faces generally upwardly to provide a flat surface suitable for writing thereon. It will further be noted that the upper edge portion 76 of the table member is presented to the rear seat passenger so as to provide a safety barrier in the event of a sudden stop and prevent this passenger from engaging the seat 10.

When the table member 16 is in its upright position, as shown in FIGURES 1 and 2, it provides a safety barrier for the rear seat passenger.

It will be noted that the latch 72 is recessed within the padding 44, as shown in FIGURE 3, in the interests of safety. It will be further noted that although the table member 16 has been shown as being located in the center of the front seat back, it may be located in other places on the front seat back as desired.

Thus, this invention provides a new and improved safety device and table arrangement for vehicle bodies.

I claim:

1. In a vehicle body having a front seat provided with a seat back, the combination comprising, a table member having a generally flat surface on one side thereof, yieldable padding secured to an opposite side of said member and extending over an edge thereof to said one side thereof, and hinge means mounting said member on said seat back for movement between a first generally upright position wherein said one side thereof engages said seat back and said other padded side thereof is presented to a rear seat passenger and a second generally horizontally disposed position wherein said one side thereof provides a writing surface and said padding on said edge thereof is presented to said rear seat passenger, said hinge means including a pair of vertically disposed hinge arms, each pivotally connected adjacent the upper end thereof to said seat back and adjacent the lower end thereof to said table member for swinging movement relative thereto, each of said hinge arms including an extension intermediate the ends thereof, said extensions being located in spaced opposite relationship to each other when said table member is in said first position thereof and being located in abutting opposite relationship to each other when said table member is in said second position to locate said table member in said second position thereof and locate said hinge arms in a generally horizontally disposed position.

2. In a vehicle body having a front seat provided with a seat back, the combination comprising, a table member having a generally flat surface on one side thereof, yieldable padding secured to an opposite side of said member and extending over an edge thereof to said one side thereof, and hinge means mounting said member on said seat back for movement between a first generally upright position wherein said one side thereof engages said seat back and said other padded side thereof is presented to a rear seat passenger and a second generally horizontally disposed position wherein said one side thereof provides a writing surface and said padding on said edge thereof is presented to said rear seat passenger, said hinge means including a pair of vertically disposed hinge arms, each pivotally connected adjacent the upper end thereof to said seat back and adjacent the lower end thereof to said table member, each of said hinge arms including an extension intermediate the ends thereof, said extensions extending generally horizontally opposite to each other when said table member is in said first position thereof and being located in generally vertically extending abutting relationship when said table member is in said second position thereof to locate said table member in said second position thereof and locate said hinge arms in a generally horizontally disposed position.

References Cited in the file of this patent

UNITED STATES PATENTS

| 1,646,266 | Stoner | Oct. 18, 1927 |
| 2,749,143 | Chika | June 5, 1956 |
| 2,833,334 | Hunt | May 6, 1958 |

FOREIGN PATENTS

| 639,087 | Germany | Nov. 28, 1936 |
| 413,106 | Great Britain | July 12, 1934 |